United States Patent
Lien et al.

(10) Patent No.: US 10,568,078 B2
(45) Date of Patent: Feb. 18, 2020

(54) USER EQUIPMENT AND BASE STATION

(71) Applicant: Institute For Information Industry, Taipei (TW)

(72) Inventors: Shao-Yu Lien, Pingtung County (TW); Chun-Che Chien, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 16/006,780

(22) Filed: Jun. 12, 2018

(65) Prior Publication Data

US 2018/0368136 A1 Dec. 20, 2018

Related U.S. Application Data

(60) Provisional application No. 62/520,983, filed on Jun. 16, 2017.

(51) Int. Cl.
*H04W 72/04* (2009.01)
*H04W 72/12* (2009.01)
*H04L 5/00* (2006.01)

(52) U.S. Cl.
CPC ....... *H04W 72/0413* (2013.01); *H04L 5/0053* (2013.01); *H04L 5/0091* (2013.01); *H04W 72/1268* (2013.01); *H04L 5/0048* (2013.01); *H04W 72/1252* (2013.01)

(58) Field of Classification Search
None
See application file for complete search history.

(56) References Cited

U.S. PATENT DOCUMENTS

| | | | |
|---|---|---|---|
| 2016/0295624 A1 | 10/2016 | Novlan et al. | |
| 2018/0070335 A1* | 3/2018 | Amuru | H04L 5/0044 |
| 2018/0092104 A1* | 3/2018 | Sheng | H04W 72/085 |
| 2018/0092125 A1* | 3/2018 | Sun | H04W 74/02 |
| 2018/0139773 A1* | 5/2018 | Ma | H04L 5/0053 |
| 2018/0139778 A1* | 5/2018 | Chou | H04W 76/27 |
| 2018/0152907 A1* | 5/2018 | Zhang | H04W 74/006 |
| 2018/0199334 A1* | 7/2018 | Ying | H04W 72/0413 |
| 2018/0262316 A1* | 9/2018 | Wang | H04W 72/1278 |

(Continued)

FOREIGN PATENT DOCUMENTS

| | | |
|---|---|---|
| CN | 106301738 A | 1/2017 |
| CN | 106788943 A | 5/2017 |
| CN | 106793091 A | 5/2017 |

OTHER PUBLICATIONS

Office Action to the corresponding Taiwan Patent Application rendered by the Taiwan Intellectual Property Office (TIPO) dated Jan. 11, 2019, 13 pages (including English translation).

*Primary Examiner* — Michael J Moore, Jr.
(74) *Attorney, Agent, or Firm* — Skaar Ulbrich Macari, P.A.

(57) ABSTRACT

A user equipment (UE) and a base station (BS) are provided. The UE receives an uplink transmission configuration message indicating a pre-configured radio resource pool and an uplink control configuration message indicating an uplink control radio resource in the pre-configured radio resource pool from the BS. The UE transmits an uplink control message on the uplink control radio resource and transmits an uplink data signal on an uplink data radio resource in the pre-configured radio resource pool so that the BS receives the uplink data signal according to the uplink control message.

18 Claims, 9 Drawing Sheets

(56) References Cited

U.S. PATENT DOCUMENTS

| | | | |
|---|---|---|---|
| 2018/0295651 A1* | 10/2018 | Cao | H04W 76/27 |
| 2018/0368157 A1* | 12/2018 | Jeon | H04W 72/1257 |
| 2018/0368160 A1* | 12/2018 | Kunt | H04W 72/14 |
| 2018/0368174 A1* | 12/2018 | Jeon | H04W 72/14 |
| 2019/0124683 A1* | 4/2019 | Zhang | H04L 1/1812 |

* cited by examiner

USER EQUIPMENT AND BASE STATION

PRIORITY

This application claims priority to U.S. Provisional Patent Application No. 62/520,983 filed on Jun. 16, 2017, which is hereby incorporated by reference in its entirety.

FIELD

The present invention relates to a user equipment and a base station. Specifically, the base station may allocate uplink control radio resources from a pre-configured radio resource pool respectively to a plurality of user equipments, and a user equipment may transmit an uplink control message on the uplink control radio resource allocated thereto and select on its own an uplink data radio resource from the pre-configured radio resource pool for uplink data signal transmission in an uplink grant-free condition.

BACKGROUND

With the rapid development of the wireless communication technology, various applications of wireless communication are ubiquitous in people's daily life and requirements of people for wireless communication are increasing day by day. To satisfy various applications in daily life, the next generation of mobile communication system (which is generally referred to as the 5G mobile communication system currently) has proposed new service types, e.g., Ultra-reliable and Low Latency Communication (URLLC), Enhanced Mobile Broadband (eMBB) communication, and Massive Machine Type Communication (mMTC). The URLLC service provides characteristics of high reliability and low latency, so it is quite suitable for applications of vehicle-carried communication (e.g., Vehicle to Everything communication).

Because the uplink data signal transmission of URLLC and mMTC is sporadic, to achieve transmission of high reliability and low latency, the base station allocates non-overlapped UE-specific uplink radio resources in advance respectively to a user equipment supporting the URLLC service (which is called a URLLC user equipment hereinafter) and a user equipment supporting the mMTC service (which is called an mMTC user equipment hereinafter) for uplink data signal transmission by the URLLC user equipment and the mMTC user equipment. In this case, since the pre-configured radio resources allocated to each of the user equipments (i.e., the URLLC user equipment and the mMTC user equipment) are not overlapped with each other, the uplink data signal transmission among the user equipments will not affect each other. However, this will cause the reduction in utilization efficiency of whole radio resources, and further speaking, this may cause incapability of supporting large-scale connection of the mMTC user equipments. Moreover, the current uplink data signal transmission of the URLLC and mMTC does not provide the transmission of uplink control signals, so the user equipments can only perform the uplink data signal transmission according to parameters pre-configured by the base station so that the uplink data signal transmission is not flexible.

Accordingly, an urgent need exists in the art to provide an uplink transmission configuration mechanism, thereby improving the radio resource utilization efficiency and increasing the flexibility in uplink data signal transmission.

SUMMARY

An objective of certain embodiments of the present invention is to provide an uplink transmission configuration mechanism which enables a base station to allocate uplink control radio resources from a pre-configured radio resource pool respectively to a plurality of user equipments, and in an uplink grant-free condition, the user equipment may transmit an uplink control message on the uplink control radio resource allocated thereto and select on its own an uplink data radio resource from the pre-configured radio resource pool for uplink data signal transmission so that the base station receives the uplink data signal according to the uplink control message. In this way, the present invention enables multiple user equipments to share the same pre-configured radio resource pool and perform uplink data signal transmission directly in an uplink grant-free condition, thereby improving the radio resource utilization efficiency and increasing the flexibility in uplink data signal transmission.

The disclosure includes a user equipment which comprises a storage, a transceiver and a processor. The processor is electrically connected to the storage and the transceiver and is configured to perform the following operations: receiving an uplink transmission configuration message indicating a pre-configured radio resource pool from a base station via the transceiver; receiving an uplink control configuration message indicating an uplink control radio resource in the pre-configured radio resource pool from the base station via the transceiver; transmitting an uplink control message on the uplink control radio resource and transmitting an uplink data signal on an uplink data radio resource in the pre-configured radio resource pool via the transceiver so that the base station receives the uplink data signal according to the uplink control message.

The disclosure further includes a base station which comprises a storage, a transceiver and a processor. The processor is electrically connected to the storage and the transceiver and is configured to perform the following operations: transmitting a first uplink transmission configuration message indicating a first pre-configured radio resource pool to a first user equipment via the transceiver; transmitting a first uplink control configuration message indicating a first uplink control radio resource in the first pre-configured radio resource pool to the first user equipment via the transceiver so that the first user equipment transmits a first uplink control message on the first uplink control radio resource and transmits a first uplink data signal on a first uplink data radio resource in the first pre-configured radio resource pool; receiving the first uplink control message via the transceiver; and receiving the first uplink data signal via the transceiver according to the first uplink control message.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to certain example embodiments thereof. However, these example embodiments are not intended to limit the present invention to any specific examples, embodiments, environment, applications or particular implementations described in these example embodiments. Therefore, description of these example embodiments is only for purpose of illustration rather than to limit the present invention.

It should be appreciated that, in the following embodiments and the attached drawings, elements unrelated to the present invention are omitted from depiction; and dimensional relationships among individual elements in the attached drawings are provided only for ease of understanding, but not to limit the actual scale.

Figure 1:
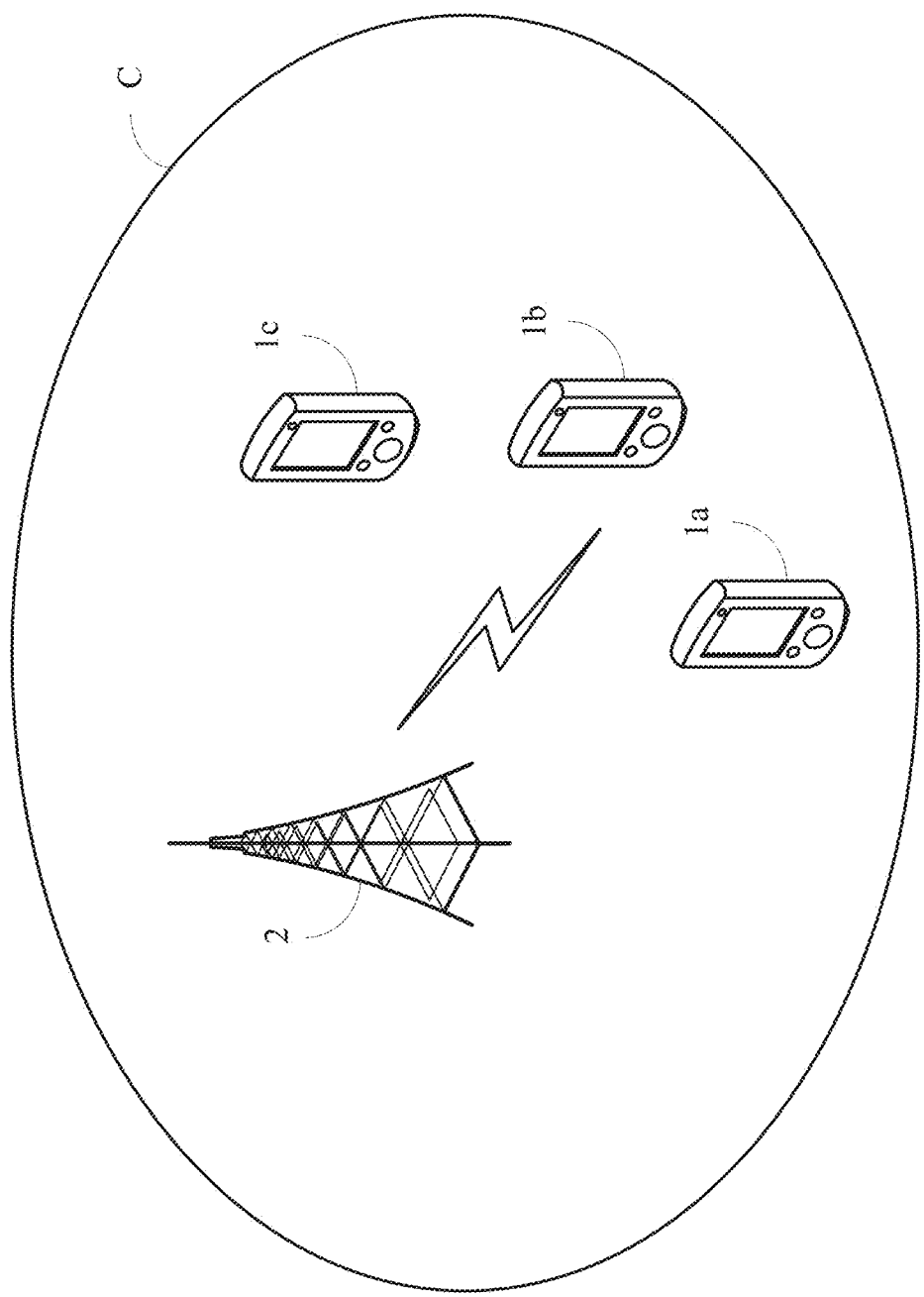
FIG. 1 depicts an implementation scenario of a wireless communication system according to the present invention.
Figure 2:
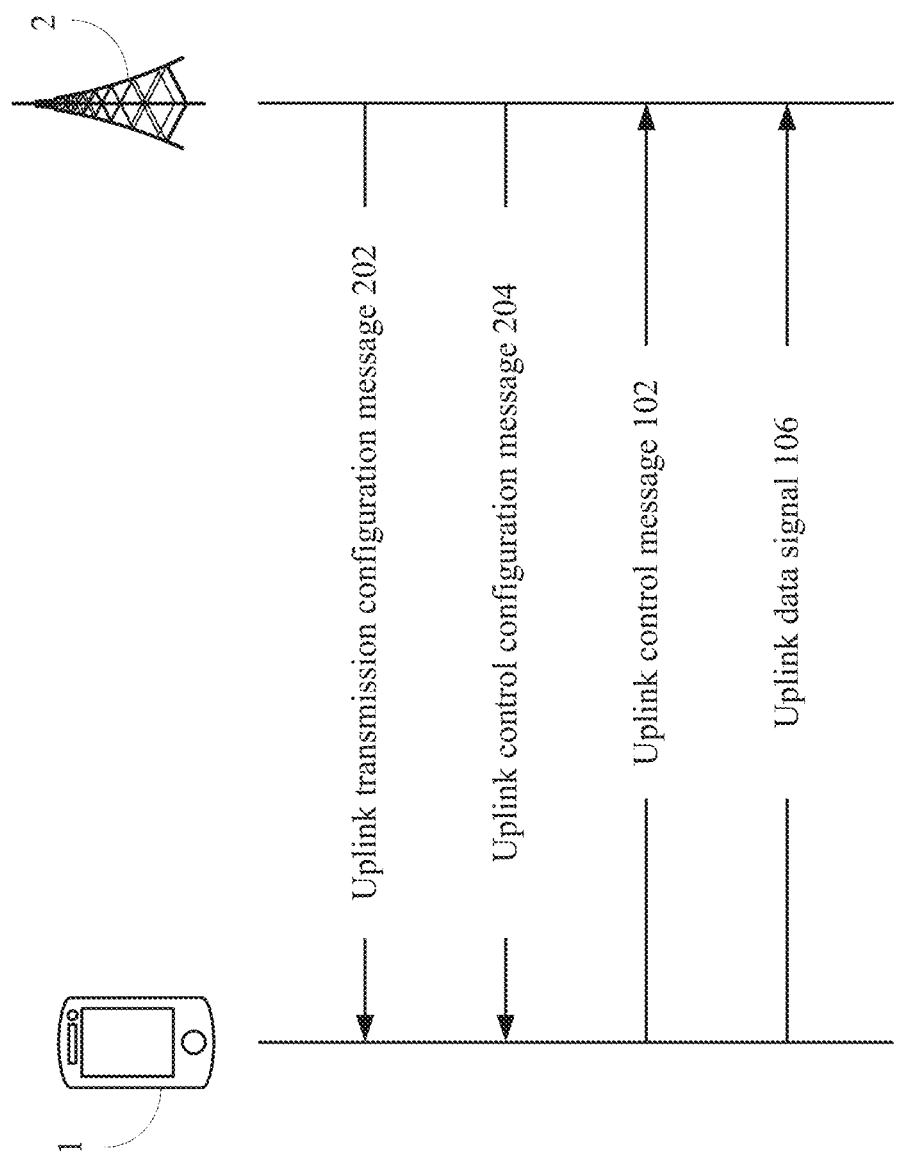
FIG. 2 depicts an implementation scenario of signal transmission between the user equipment 1 and the base station 2 according to the present invention.
Figure 3:
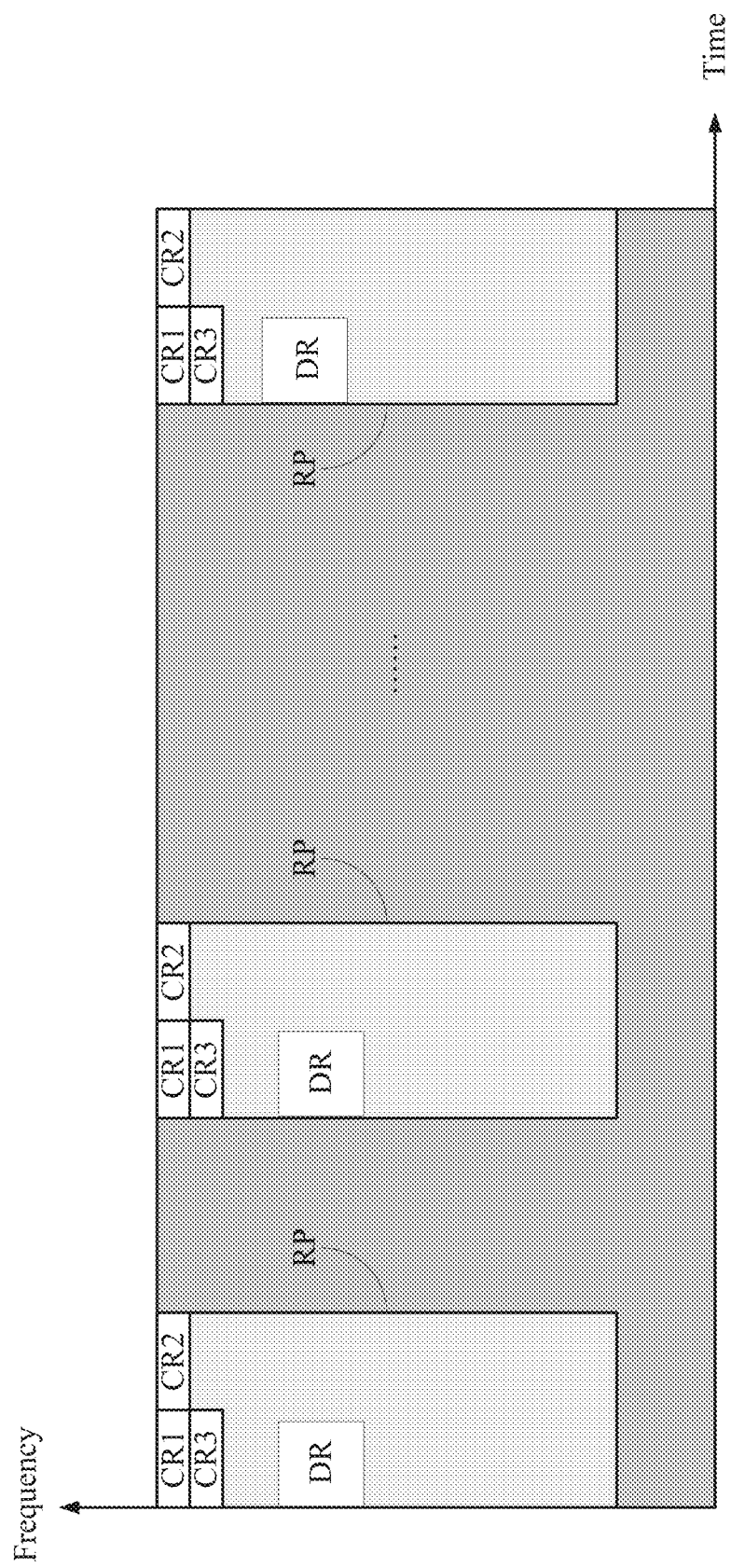
FIG. 3 depicts a pre-configured radio resource pool.

A first embodiment of the present invention is as shown in FIG. 1 to FIG. 3. FIG. 1 depicts an implementation scenario of a wireless communication system according to the present invention. FIG. 2 depicts an implementation scenario of signal transmission between the user equipment 1 and the base station 2 according to the present invention. It shall be appreciated that, in FIG. 2, the user equipment 1 may be any of user equipments 1a, 1b and 1c, and for simplification of the description, FIG. 2 depicts the signal transmission between a single user equipment 1 and the base station 2 as an example for illustration. However, as shall be appreciated by those of ordinary skill in the art based on the following description, the base station 2 may also perform signal transmission with other user equipments at the same time, and this will be not further described herein.

As shown in FIG. 1, the base station 2 in a wireless communication system has a signal coverage range C, and the user equipments 1a, 1b and 1c are all located within the signal coverage range C. For simplification of the description, only three user equipments 1a, 1b and 1c are depicted in FIG. 1. However, the number of the user equipments within the signal coverage range C of the base station 2 is not intended to limit the present invention. The wireless communication system may be a next generation of mobile communication system (which is broadly referred to as the 5G mobile communication system currently), or any mobile communication system based on the Orthogonal Frequency Division Multiple Access (OFDMA) technology. Each of the user equipments 1a, 1b and 1c may be a smart phone, a tablet computer or any wireless communication device satisfying sporadic uplink transmission and being uplink grant-free, e.g., the URLLC user equipment or the mMTC user equipment, without being limited thereto.

The user equipment 1 receives an uplink transmission configuration message 202 indicating a pre-configured radio resource pool RP from the base station 2. The pre-configured radio resource pool RP belongs to a Semi-Persistent Scheduling (SPS) resource to be used by multiple user equipments (e.g., user equipments 1a, 1b and 1c) for uplink data signal transmission in the uplink grant-free condition. The pre-configured radio resource pool RP is periodically configured from the radio resources that can be used by the base station 2, as shown in FIG. 3. The uplink transmission configuration message 202 may be a radio resource control (RRC) message, or may be further combined with Layer 1 Signaling. The Layer 1 Signaling may be downlink control information (DCI).

The base station 2 may determine, according to the current radio resource utilization efficiency, the uplink data transmission type of the user equipment, and the Quality of Service (QoS) required by the user equipment, whether to additionally allocate radio resources for transmitting the uplink control messages from the pre-configured radio resource pool RP for use by the user equipments, thereby increasing the reliability and the flexibility in the uplink data signal transmission. In this case, the user equipment 1 may further receive an uplink control configuration message 204 from the base station 2. The uplink control configuration message 204 may be one of downlink control information (DCI), a medium access control (MAC) layer control element, a radio resource control (RRC) message and any combinations thereof.

For example, when the user equipment 1 is the user equipment 1a, the uplink control configuration message 204 transmitted to the user equipment 1a indicates an uplink control radio resource CR1 in the pre-configured radio resource pool RP. When the user equipment 1 is the user equipment 1b, the uplink control configuration message 204 transmitted to the user equipment 1b indicates an uplink control radio resource CR2 in the pre-configured radio resource pool RP. When the user equipment 1 is the user equipment 1c, the uplink control configuration message 204 transmitted to the user equipment 1c indicates an uplink control radio resource CR3 in the pre-configured radio resource pool RP. In other words, the base station 2 allocates the uplink control radio resources CR1 to CR3 respectively to different user equipments 1a, 1b and 1c, as shown in FIG. 3.

In the pre-configured radio resource pool RP, the uplink control radio resources CR1 to CR3 allocated to the user equipments 1a, 1b and 1c are not overlapped with each other. It shall be appreciated that, the uplink control radio resources being not overlapped described herein refers to being not overlapped in at least of a time-frequency domain, a code domain and a spatial domain. Being not overlapped in the code domain may be achieved through using different code sequences for spectrum spreading of uplink data signals by the user equipments. The code sequences may adopt code sequences generated by Code Division Multiple Access (CDMA), Sparse Code Multiple Access (SCMA), Interleave Division Multiple Access (IDMA) or other code domain multiple access technologies. Being not overlapped in the spatial domain may be achieved by the technology of beamforming, which enables different user equipments to transmit uplink data signals by using beams of different particular directions.

The following description takes the case where the user equipment 1 is the user equipment 1a as an example for illustration. After the uplink control configuration message 204, the user equipment 1 may transmit an uplink control message 102 on the uplink control radio resource CR1 when the user equipment 1 needs to transmit an uplink data signal 106 to the base station 2. The uplink control message 102 may be configured to indicate transmission parameters relevant to the uplink data signal 106 (e.g., a time-frequency resource position in the pre-configured radio resource pool RP). Next, the use equipment 1 transmits an uplink data signal 106 on an uplink data radio resource DR in the pre-configured radio resource pool RP. In this way, the base station 2 may receive the uplink data signal 106 according to the uplink control message 102.

Further speaking, the uplink data radio resource DR is the uplink data radio resource selected by the user equipment 1 itself directly from the pre-configured radio resource pool RP in the uplink grant-free condition. Because the user equipment 1 does not need to transmit a scheduling request (SR) to the base station 2 to request the base station 2 to allocate a dedicated uplink radio resource before transmitting the uplink data signal in the uplink grant-free condition, the data transmission delay of the user equipment 1 can be reduced. Additionally, the uplink control configuration message 204 may further indicate at least one carriable parameter in the uplink control message 102, i.e., at least one parameter that can be carried in the uplink control message 102 by the user equipment 1. The at least one carriable parameter may be configured to indicate at least one of a data type, number of repetitions, a modulation and coding scheme (MCS), a transport block size (TBS) and a time-frequency resource position of the uplink data radio resource DR.

For example, the content carried in the uplink control message 102 may include multiple fields respectively corresponding to the data type, the number of repetitions, the MCS, the TBS and the time-frequency resource position, and the uplink control configuration message 204 may indicate which ones among the fields may be set by the user equipment 1 itself, i.e., indicate which fields are activated. For the activated fields, the user equipment 1 may make decision according to the requirement of transmitting the uplink data signal 106, e.g., selects the suitable MCS and time-frequency resource position. The carriable parameter corresponding to the time-frequency resource position may represent the position and the size of the uplink data radio resource DR in the pre-configured radio resource pool RP by an absolute position or a relative position. The carriable parameters corresponding to the number of repetitions, the MCS or the TBS may be practical values or represented by codes. For the inactivated fields, the user equipment 1 transmits the uplink data signal 106 according to preset values pre-configured by the base station 2. The carriable parameter corresponding to the data type may indicate whether the uplink data carried by the current uplink data signal 106 is newly transmitted or re-transmitted by means of codes, thereby solving the problem in the prior art that the function of performing uplink data signal retransmission by the URLLC user equipment and the mMTC user equipment is not provided.

Figure 4:
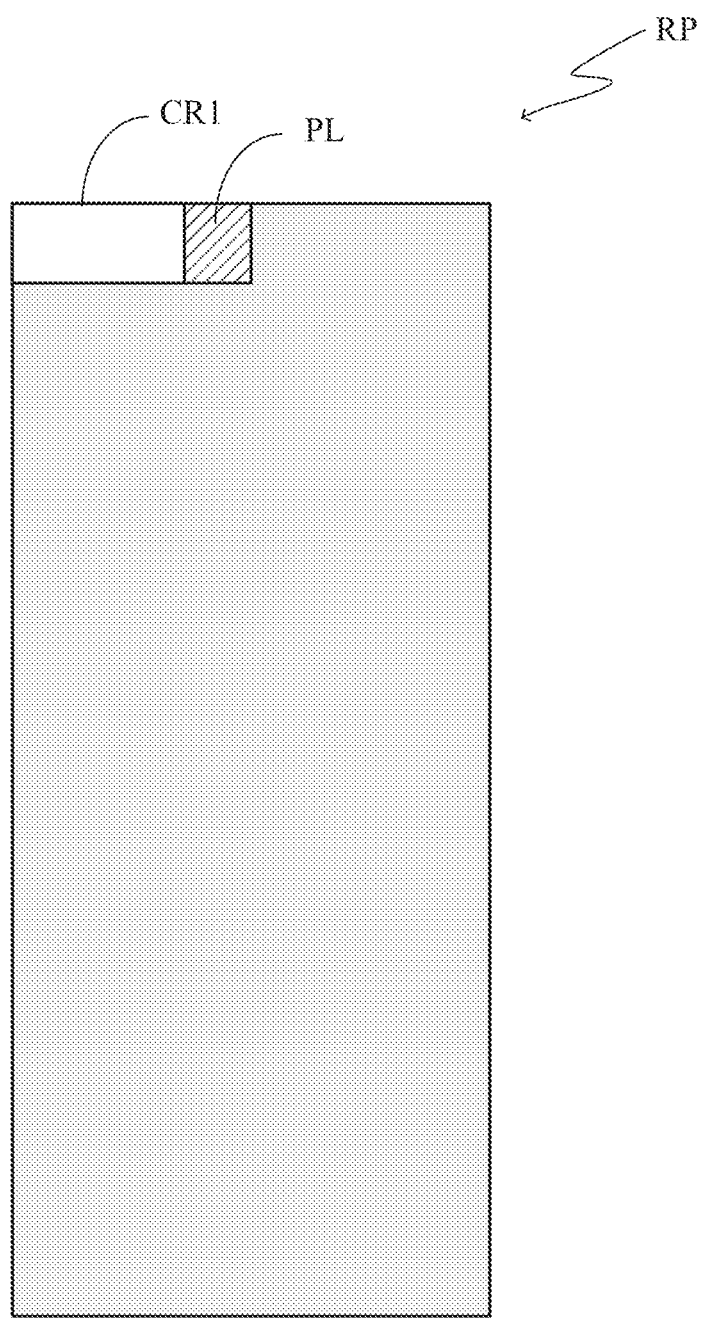
FIG. 4 depicts a schematic view of a data payload region in an uplink control radio resource.

A second embodiment of the present invention is as shown in FIG. 4, and FIG. 4 only depicts one pre-configured radio resource pool RP for simplification of the description. In this embodiment, each of the uplink control radio resources may have one data payload region. Taking the uplink control radio resource CR1 as an example, the uplink control radio resource CR1 comprises one data payload region PL. When the data size of the uplink data signal 106 to be transmitted by the user equipment 1 is less than a preset value, the user equipment 1 may transmit the uplink data signal 106 in the data payload region PL, i.e., take the data payload region PL as the uplink data radio resource DR. In this case, the uplink data radio resource DR is included within the data payload region PL in the uplink control radio resource CR1.

Further speaking, before transmitting the uplink data signal 106, the user equipment 1 may determine whether a data size of the uplink data signal 106 is less than a preset value (the preset value is determined according to the size of the data payload region PL). When the data size is less than the preset value, the user equipment 1 may directly carry the uplink data signal 106 on the data payload region PL in the uplink control radio resource CR1, thereby further reducing the transmission delay of the uplink data, and meanwhile avoiding collision between the uplink data radio resource selected by the user equipment 1 and the uplink data radio resource selected by other user equipments.

Figure 5:
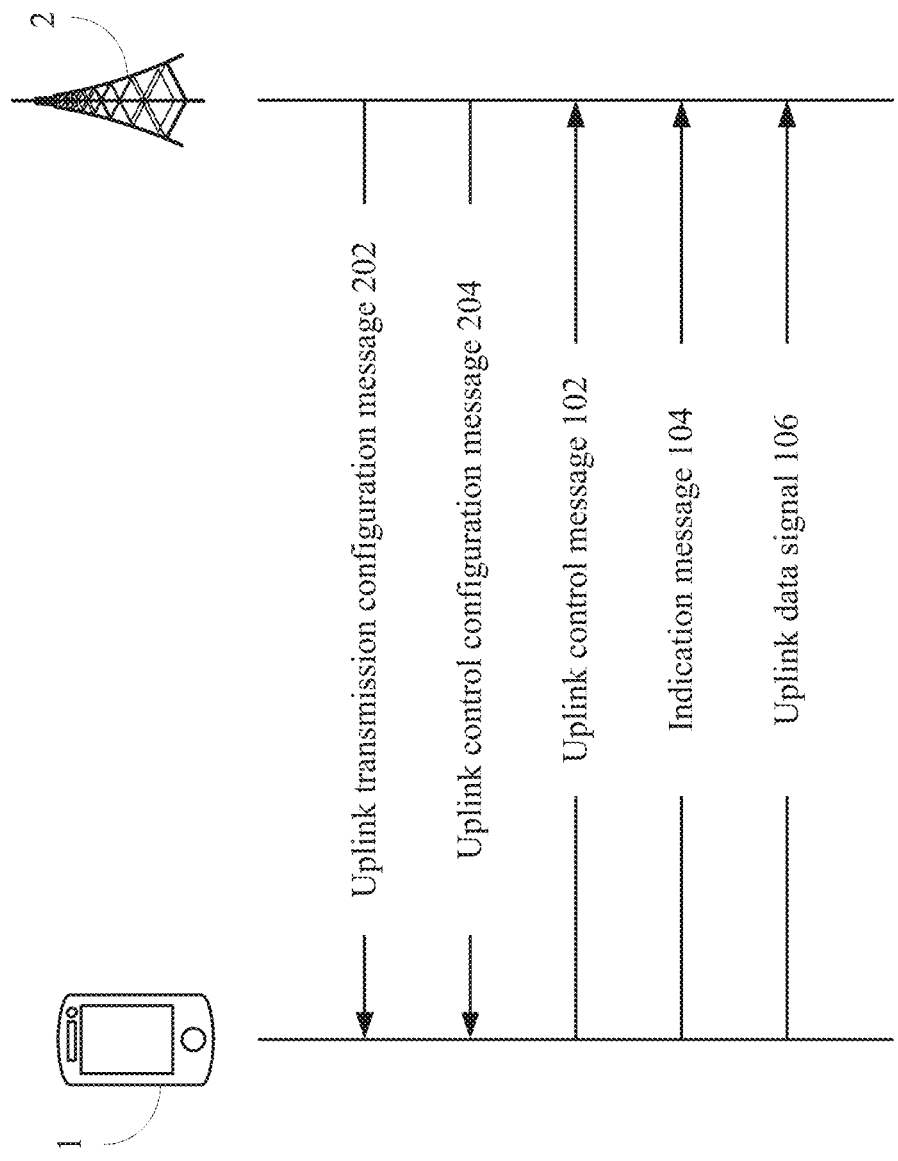
FIG. 5 depicts an implementation scenario of signal transmission between the user equipment 1 and the base station 2 according to the present invention.

A third embodiment of the present invention is as shown in FIG. 5. Different from the second embodiment, in this embodiment, the data payload region PL is configured to transmit an indication message 104, and the uplink data radio resource DR for transmitting the uplink data signal 106 is not included in the uplink control radio resource CR1 (i.e., the uplink data signal 106 is transmitted in the way described in the first embodiment). The indication message 104 indicates at least one of a hybrid automatic repeat request (HARQ), channel state information (CSI) and a scheduling request (SR). For example, the user equipment 1 may transmit a scheduling request via the indication message 104 to request an additional dedicated uplink data radio resource from the base station 2, and after receiving the scheduling request, the base station 2 may allocate a proper dedicated uplink data radio resource for the user equipment 1 to transmit the subsequent uplink data signal.

It shall be appreciated that, in other embodiments, the data payload region PL may be used by the user equipment 1 for transmitting both the uplink data signal 106 and the indication message 104. In this case, the radio resource required by transmitting the indication message 104 also needs to be taken into consideration in the setting of the preset value for determining whether the uplink data signal 106 can be transmitted in the data payload region PL, i.e., the size of the radio resource required by transmitting the indication message 104 needs to be subtracted from the size of the data payload region PL in the setting of the preset value.

Figure 6:
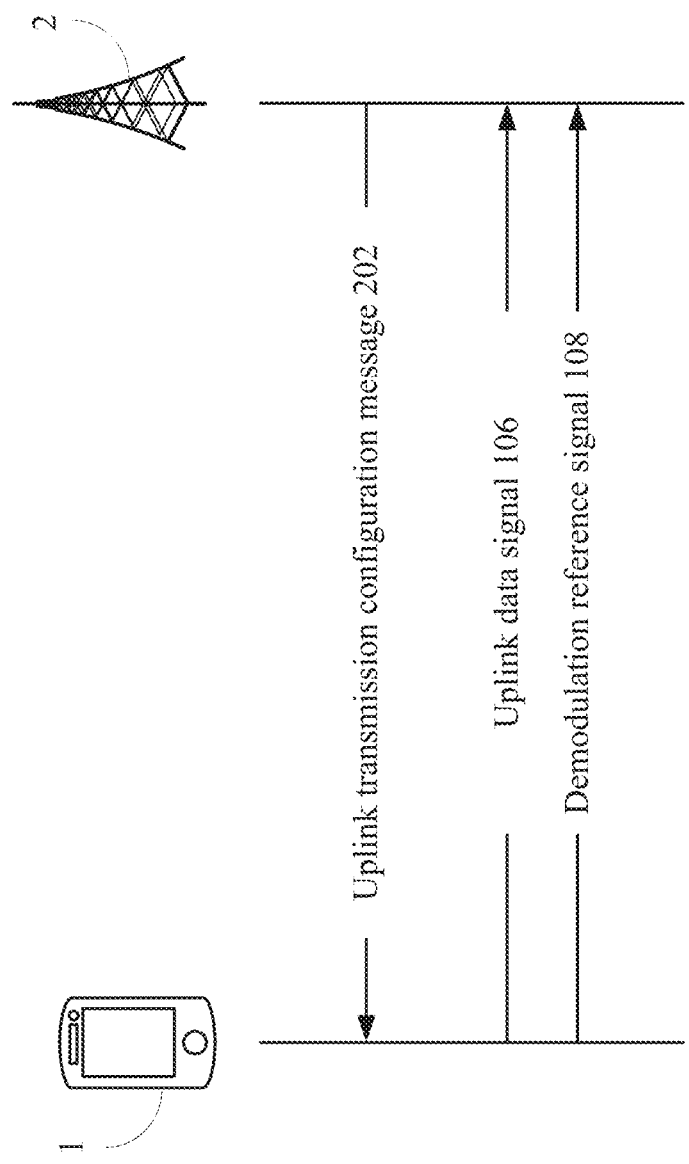
FIG. 6 depicts an implementation scenario of signal transmission between the user equipment 1 and the base station 2 according to the present invention.

A fourth embodiment of the present invention is as shown in FIG. 6. The fourth embodiment is an extension of the first embodiment. In this embodiment, the user equipment 1 transmits a demodulation reference signal (DMRS) 108 together with the uplink data signal 106. The Demodulation Reference Signal 108 is configured by the base station 2, so the base station 2 may demodulate the uplink data signal 106 based on the DMRS 108 after receiving the uplink data signal 106 and the DMRS 108.

Moreover, the DMRS 108 may also be configured to identify the user equipment 1, so the user equipment 1 may directly select a suitable uplink data radio resource DR based on parameters such as the preset number of repetitions, the modulation and coding scheme (MCS), the transport block size (TB S) or the like and transmit the uplink data signal 106 and the DMRS 108 on the uplink data radio resource DR if the uplink control configuration message 204 transmitted by the base station 2 has not yet been received by the user equipment 1 before the user equipment 1 transmits the uplink data signal 106. In this way, when the base station 2 detects signal energy in the pre-configured radio resource pool RP, the base station 2 may attempt to retrieve the DMRS 108 and demodulate and decode the uplink data signal 106, and meanwhile learn that the transmitting end is the user equipment 1 based on the DMRS 108.

Figure 7:
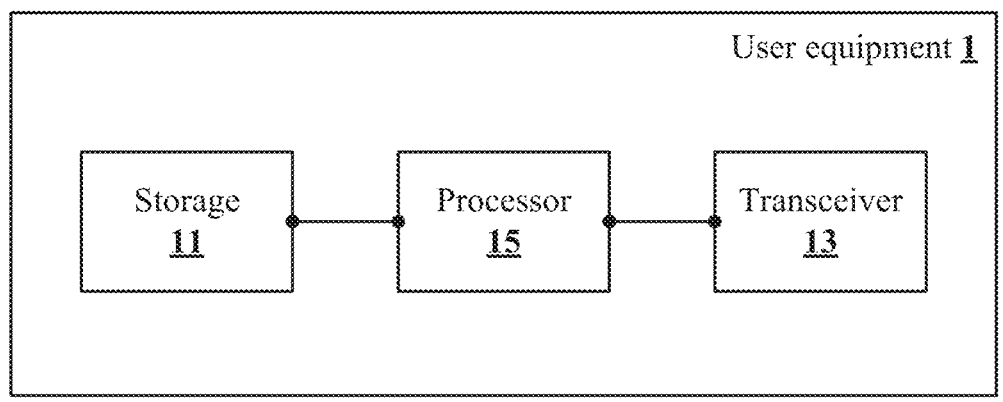
FIG. 7 is a schematic view of the user equipment 1 according to the present invention.

A fifth embodiment of the present invention is as shown in FIG. 7, which is a schematic view of the user equipment 1 according to the present invention. The user equipment 1 comprises a storage 11, a transceiver 13 and a processor 15. The processor 15 is electrically connected to the storage 11 and the transceiver 13. The processor 15 receives the uplink transmission configuration message 202 indicating the pre-configured radio resource pool RP from the base station 2 via the transceiver 13. Next, the processor 15 receives the uplink control configuration message 204 indicating an uplink control radio resource (e.g., one of the uplink control radio resources CR1, CR2 and CR3) in the pre-configured radio resource pool RP from the base station 2 via the transceiver 13. As described in the first embodiment, the uplink control configuration message 204 may be one of downlink control information (DCI), a medium access control (MAC) layer control element, a radio resource control (RRC) message and any combinations thereof.

Thereafter, the processor 15 transmits the uplink control message 102 on the uplink control radio resource and transmits the uplink data signal 106 on the uplink data radio resource (e.g., the uplink data radio resource DR) in the pre-configured radio resource pool RP via the transceiver 13 so that the base station 2 receives the uplink data signal 106 according to the uplink control message 102.

In an embodiment, the uplink control configuration message 204 indicates at least one carriable parameter in the uplink control message 102, and the at least one carriable parameter is configured to indicate at least one of a data type, number of repetitions, a modulation and coding scheme (MCS), a transport block size (TBS) and a time-frequency resource position of the uplink data radio resource.

Moreover, in an embodiment, in the pre-configured radio resource pool, the uplink control radio resource allocated to the user equipment 1 and at least one other radio resource allocated to at least one other user equipment are not overlapped with each other. As shown in FIG. 3, the base station allocates different uplink control radio resources to different user equipments, e.g., allocates the uplink control radio resource CR1 to the user equipment 1a in FIG. 1, allocates the uplink control radio resource CR2 to the user equipment 1b and allocates the uplink control radio resource CR3 to the user equipment 1c.

In an embodiment, the processor 15 further determines whether a data size of the uplink data signal 106 is less than a preset value. When the data size of the uplink data signal 106 is less than a preset value, the uplink data radio resource is included in the data payload region of the uplink control radio resource, as shown FIG. 4. In other words, as described in the second embodiment, the data payload region PL in the uplink control radio resource CR1 may be used by the user equipment 1 for transmitting the uplink data signal 106.

In an embodiment, the processor 15 further transmits the indication message 104 in the data payload region of the uplink control radio resource via the transceiver 13, and the indication message 104 indicates at least one of a hybrid automatic repeat request (HARQ), channel state information (CSI) and a scheduling request (SR), as shown in FIG. 5.

Moreover, in other embodiments, the processor 15 further transmits the demodulation reference signal (DMRS) 108 on the uplink data radio resource via the transceiver 13, as shown in the implementation scenario of FIG. 6. As described previously, the DMRS 108 is configured by the base station 2, so the user equipment 1 may transmit the DMRS 108 to enable the base station 2 to identify the user equipment 1 transmitting the uplink data signal 106 and demodulate the uplink data signal 106 in the case where the uplink control configuration message 204 is not received by the user equipment 1.

Figure 8:
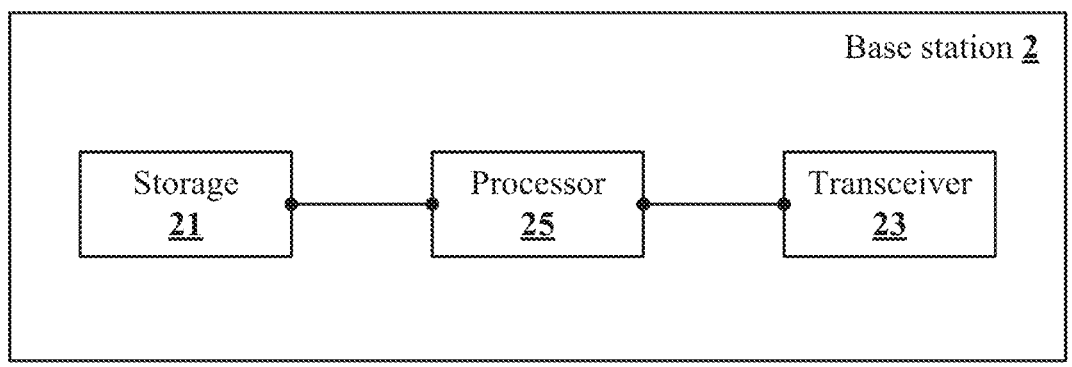
FIG. 8 is a schematic view of the base station 2 according to the present invention.

A sixth embodiment of the present invention is as shown in FIG. 8, which is a schematic view of the base station 2 according to the present invention. The base station 2 comprises a storage 21, a transceiver 23 and a processor 25. The processor 25 is electrically connected to the storage 21 and the transceiver 23. The processor 25 transmits a first uplink transmission configuration message (e.g., the uplink transmission configuration message 202) indicating a first pre-configured radio resource pool (e.g., the pre-configured radio resource pool RP) to a first user equipment (e.g., the user equipment 1a) via the transceiver 23. Next, the processor 25 transmits a first uplink control configuration message (e.g., the uplink control configuration message 204) to the first user equipment via the transceiver 23. The first uplink control configuration message indicates a first uplink control radio resource (e.g., the uplink control radio resource CR1) in the first pre-configured radio resource pool.

In the implementation scenario of FIG. 3, the processor 25 may take the uplink control radio resource CR1 as the first uplink control radio resource and allocate the uplink control radio resource CR1 to the first user equipment. The first user equipment may transmit a first uplink control message (e.g., the uplink control message 102) on the first uplink control radio resource according to the first uplink control configuration message, and transmits a first uplink data signal (e.g., the uplink data signal 106) on a first uplink data radio resource (e.g., the uplink data radio resource DR) in the first pre-configured radio resource pool. Thereafter, the processor 25 receives the first uplink control message via the transceiver 23, and receives the first uplink data signal according to the first uplink control message via the transceiver 23.

In an embodiment, the first uplink control configuration message indicates at least one carriable parameter in the first uplink control message, and the at least one carriable parameter is configured to indicate at least one of the data type, the number of repetitions, the modulation and coding scheme (MCS), the transport block size (TBS) and the time-frequency resource position of the first uplink data radio resource.

Moreover, in other embodiments, the first uplink control configuration message is one of downlink control information (DCI), a medium access control (MAC) layer control element, a radio resource control (RRC) message and any combinations thereof.

In an embodiment, the first uplink data radio resource is included in the data payload region of the first uplink control radio resource, and a data size of the first uplink data signal is less than a preset value, as described in the second embodiment.

In an embodiment, the processor 25 further receives an indication message (e.g., the indication message 104) in a data payload region of the first uplink control radio resource via the transceiver 23, and the indication message indicates at least one of a hybrid automatic repeat request (HARQ), channel state information (CSI) and a scheduling request (SR), as described in the third embodiment.

Moreover, in other embodiments, the processor 25 further receives a demodulation reference signal (DMRS) on the first uplink data radio resource via the transceiver 23. The Demodulation Reference Signal is configured by the processor 25, and if the processor 25 does not configure the uplink control configuration message to the user equipment, the user equipment may transmit the DMRS for identification by the base station and demodulate the uplink data signal, as described in the fourth embodiment.

In an embodiment, the processor 25 further transmits a second uplink transmission configuration message to a second user equipment (e.g., the user equipment 1b) via the transceiver 23. The second uplink transmission configuration message indicates a second pre-configured radio resource pool. The first pre-configured radio resource pool is at least partially overlapped with the second pre-configured radio resource. In the embodiment as shown in FIG. 3, the first pre-configured radio resource pool is the same as the second pre-configured radio resource pool, i.e., both the first pre-configured radio resource pool and the second pre-configured radio resource pool are the pre-configured radio resource pool RP.

Next, the processor 25 transmits a second uplink control configuration message to the second user equipment via the transceiver 23. The second uplink control configuration message indicates a second uplink control radio resource in the second pre-configured radio resource pool. The first uplink control radio resource is not overlapped with the second uplink control radio resource. As shown in the implementation scenario of FIG. 3, the processor 25 may take the uplink control radio resource CR1 as the first uplink control radio resource and allocate the uplink control radio resource CR1 to the first user equipment (e.g., the user equipment 1a), and take the uplink control radio resource CR2 as the second uplink control radio resource and allocate the uplink control radio resource CR2 to the second user equipment (e.g., the user equipment 1b) to make the second user equipment transmit a second uplink control message on the second uplink control radio resource and transmit a second uplink data signal on a second uplink data radio resource in the second pre-configured radio resource pool, the second uplink control configuration message. Finally, the processor 25 receives the second uplink control message via the transceiver 23 and receives the second uplink data signal via the transceiver 23 according to the second uplink control message.

Figure 9:
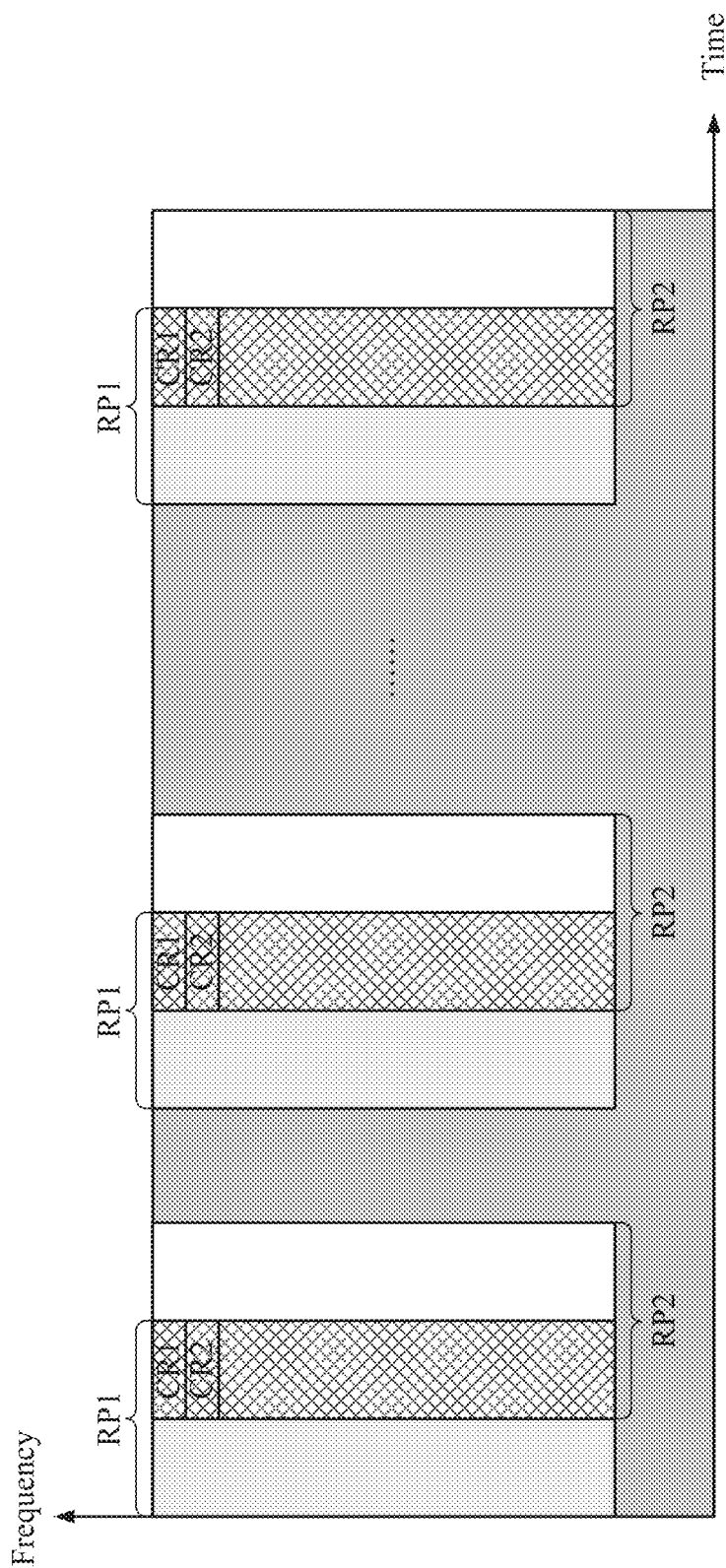
FIG. 9 depicts the base station 2 allocating a first pre-configured radio resource pool RP1 and a second pre-configured radio resource pool RP2 partially overlapped with each other to different user equipments.

Additionally, please further refer to FIG. 9 for a scenario where the first pre-configured radio resource pool is partially overlapped with the second pre-configured radio resource pool. Here it is assumed that, the base station 2 allocates the pre-configured radio resource pools based on different groups. The base station 2 allocates a first pre-configured radio resource pool RP1 for user equipments in a first group, and the base station 2 allocates a second re-configured radio resource pool RP2 for user equipments in a second group. An overlapped portion (i.e., a meshed portion in FIG. 9) may exist between the first pre-configured radio resource pool RP1 and the second pre-configured radio resource pool RP2.

In this case, if the user equipment 1a belongs to the first group and the user equipment 1b belongs to the second group, then the uplink control radio resource CR1 allocated to the user equipment 1a by the base station 2 and the uplink control radio resource CR2 allocated to the user equipment 1b by the base station 2 may be in the overlapped portion (as shown in FIG. 9) or not in the overlapped portion (not shown). In other words, there is no particular limitation as long as the uplink control radio resource CR1 and the uplink control radio resource CR2 are not overlapped with each other. Thereafter, the user equipment 1a may select the first uplink data radio resource to be used for transmitting the first uplink data signal in the first pre-configured radio resource pool RP1, and the user equipment 1b may select the second uplink data radio resource to be used for transmitting the second uplink data signal in the second pre-configured radio resource pool RP2. Various operations and variations in the scenario where the first pre-configured radio resource pool and the second pre-configured radio resource pool are partially overlapped shall be appreciated by those of ordinary skill in the art based on the above descriptions, and thus will not be further described herein.

According to the above descriptions, the uplink transmission configuration mechanism of the present invention enables a base station to allocate uplink control radio resources from a pre-configured radio resource pool respectively to different user equipments, and in an uplink grant-free condition, a user equipment may transmit an uplink control message on the uplink control radio resource allocated thereto and select on its own an uplink data radio resource from the pre-configured radio resource pool for uplink data signal transmission so that the base station receives the uplink data signal according to the uplink control message. In this way, the present invention enables multiple user equipments to share the same pre-configured radio resource pool and perform uplink data signal transmission directly in an uplink grant-free condition, thereby improving the radio resource utilization efficiency and increasing the flexibility in uplink data signal transmission. Moreover, the present invention retains a data payload region in the uplink control radio resource to be used by the user equipment to transmit an indication message, thereby solving the problem in the prior art that the function of performing uplink data signal retransmission by the URLLC user equipment and the mMTC user equipment is not provided.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A user equipment (UE), comprising:
   a storage;
   a transceiver; and
   a processor electrically connected to the storage and the transceiver, being configured to perform the following operations:
   receiving an uplink transmission configuration message indicating a pre-configured radio resource pool from a base station via the transceiver;
   receiving an uplink control configuration message indicating an uplink control radio resource in the pre-configured radio resource pool from the base station via the transceiver;
   determining whether a data size of an uplink data signal is less than a preset value; and
   transmitting an uplink control message on the uplink control radio resource and transmitting the uplink data signal on an uplink data radio resource in the pre-configured radio resource pool via the transceiver so that the base station receives the uplink data signal according to the uplink control message;
   wherein when the data size is less than the preset value, the uplink data radio resource is included in a data payload region of the uplink control radio resource.

2. The user equipment of claim 1, wherein the uplink control configuration message indicates at least one carriable parameter in the uplink control message.

3. The user equipment of claim 2, wherein the at least one carriable parameter in the uplink control message is configured to indicate at least one of a data type, number of repetitions, a modulation and coding scheme (MCS), a transport block size (TBS) and a time-frequency resource position of the uplink data radio resource.

4. The user equipment of claim 2, wherein the uplink control configuration message is one of downlink control information (DCI), a medium access control (MAC) layer control element, a radio resource control (RRC) message and any combinations thereof.

5. The user equipment of claim 1, wherein the processor further transmits an indication message in the data payload region of the uplink control radio resource via the transceiver.

6. The user equipment of claim 5, wherein the indication message indicates at least one of a hybrid automatic repeat request (HARQ), channel state information (CSI) and a scheduling request (SR).

7. The user equipment of claim 1, wherein the processor further transmits a demodulation reference signal (DMRS) on the uplink data radio resource via the transceiver.

8. The user equipment of claim 1, wherein in the pre-configured radio resource pool, the uplink control radio resource allocated to the user equipment and at least one other radio resource allocated to at least one other user equipment are not overlapped with each other.

9. The user equipment of claim 1, wherein the user equipment is one of an ultra-reliable low latency communication (URLLC) user equipment and a massive machine type communication (mMTC) user equipment.

10. A base station, comprising:
a storage;
a transceiver; and
a processor electrically connected to the storage and the transceiver, being configured to perform the following operations:
transmitting a first uplink transmission configuration message indicating a first pre-configured radio resource pool to a first user equipment via the transceiver;
transmitting a first uplink control configuration message indicating a first uplink control radio resource in the first pre-configured radio resource pool to the first user equipment via the transceiver so that the first user equipment transmits a first uplink control message on the first uplink control radio resource and transmits a first uplink data signal on a first uplink data radio resource in the first pre-configured radio resource pool;
receiving the first uplink control message via the transceiver; and
receiving the first uplink data signal via the transceiver according to the first uplink control message;
wherein when a data size of the first uplink data signal is less than a preset value, the first uplink data radio resource is included in a data payload region of the first uplink control radio resource.

11. The base station of claim 10, wherein the first uplink control configuration message indicates at least one carriable parameter in the first uplink control message.

12. The base station of claim 11, wherein the at least one carriable parameter in the first uplink control message is configured to indicate at least one of a data type, number of repetitions, a modulation and coding scheme (MCS), a transport block size (TBS) and a time-frequency resource position of the first uplink data radio resource.

13. The base station of claim 11, wherein the first uplink control configuration message is one of downlink control information (DCI), a medium access control (MAC) layer control element, a radio resource control (RRC) message and any combinations thereof.

14. The base station of claim 10, wherein the processor further receives an indication message in the data payload region of the first uplink control radio resource via the transceiver.

15. The base station of claim 14, wherein the indication message indicates at least one of a hybrid automatic repeat request (HARQ), channel state information (CSI) and a scheduling request (SR).

16. The base station of claim 10, wherein the processor further receives a demodulation reference signal (DMRS) on the first uplink data radio resource via the transceiver.

17. The base station of claim 10, wherein the processor is further configured to perform the following operations:
transmitting a second uplink transmission configuration message indicating a second pre-configured radio resource pool to a second user equipment via the transceiver, the first pre-configured radio resource pool is at least partially overlapped with the second pre-configured radio resource pool;
transmitting a second uplink control configuration message to make the second user equipment transmit a second uplink control message on the second uplink control radio resource and transmit a second uplink data signal on a second uplink data radio resource in the second pre-configured radio resource pool, the second uplink control configuration message indicating a second uplink control radio resource in the second pre-configured radio resource pool to the second user equipment via the transceiver, the first uplink control radio resource being not overlapped with the second uplink control radio resource;
receiving the second uplink control message via the transceiver; and
receiving the second uplink data signal via the transceiver according to the second uplink control message.

18. The base station of claim 17, wherein the first pre-configured radio resource pool is the same as the second pre-configured radio resource pool.

* * * * *